(12) United States Patent
Summers et al.

(10) Patent No.: US 10,662,898 B2
(45) Date of Patent: May 26, 2020

(54) INTEGRATED THRUSTER

(71) Applicant: Raytheon Company, Waltham, MA (US)

(72) Inventors: Matthew H. Summers, Marana, AZ (US); Jeremy C. Danforth, Tucson, AZ (US); David G. Garrett, Tucson, AZ (US); Dmitry V. Knyazev, Tucson, AZ (US); Stephen M. Baggs, Boston, MA (US); Gaines S. Gibson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 379 days.

(21) Appl. No.: 15/259,945

(22) Filed: Sep. 8, 2016

(65) Prior Publication Data

US 2018/0106218 A1 Apr. 19, 2018

(51) Int. Cl.
*F02K 9/34* (2006.01)
*F42B 10/66* (2006.01)
(Continued)

(52) U.S. Cl.
CPC ............... *F02K 9/34* (2013.01); *F02K 9/08* (2013.01); *F02K 9/30* (2013.01); *F02K 9/36* (2013.01);
(Continued)

(58) Field of Classification Search
CPC ...... F02K 9/08; F02K 9/30; F02K 9/34; F02K 9/36; F02K 9/38; F02K 9/88; F02K 9/95; F02K 9/97; F02K 9/978; F42B 10/661
See application file for complete search history.

(56) References Cited

U.S. PATENT DOCUMENTS 3,182,277 A 5/1965 Ashby
3,358,453 A 12/1967 Swet
(Continued)

FOREIGN PATENT DOCUMENTS

EP 0 632 546 A2 1/1995
FR 2 492 966 A1 4/1982
(Continued)

OTHER PUBLICATIONS

Dushku, Matthew, Additively Manufactured Propulsion System, Oct. 2012, AIAA (Year: 2012).*
(Continued)

*Primary Examiner* — William H Rodriguez
*Assistant Examiner* — Kyle Robert Thomas
(74) *Attorney, Agent, or Firm* — Renner, Otto, Boisselle & Sklar, LLP

(57) ABSTRACT

A thruster has an additively-manufactured housing that includes an integrally-formed nozzle with a burst disk in it. The housing is part of a casing that surrounds and encloses a propellant that is burned to produce pressurized gases that burst the burst disk and produce thrust. The thruster may be placed in a receptacle that defines a recess for receiving the thruster. The receptacle also may be additively manufactured. The thruster and the recess both may be cylindrical, with the housing being closely fit with the cylindrical walls of the receptacle. This may allow some of the structural loads on the housing, such as loads produced by the combustion of the propellant, to be transferred to the adjoining walls of the receptacle. This enables the housing to have less structural strength than if it were to have to contain the pressure from the propellant all on its own.

19 Claims, 2 Drawing Sheets

(51) Int. Cl.
  *F02K 9/30* (2006.01)
  *F02K 9/88* (2006.01)
  *F02K 9/97* (2006.01)
  *F02K 9/38* (2006.01)
  *F02K 9/08* (2006.01)
  *F02K 9/36* (2006.01)
  *F02K 9/95* (2006.01)

(52) U.S. Cl.
  CPC .................. *F02K 9/38* (2013.01); *F02K 9/88* (2013.01); *F02K 9/97* (2013.01); *F02K 9/978* (2013.01); *F42B 10/661* (2013.01); *F02K 9/95* (2013.01); *F05D 2230/30* (2013.01)

(56) References Cited

U.S. PATENT DOCUMENTS

| | | |
|---|---|---|
| 3,398,916 A | 8/1968 | van Vyve |
| 3,500,747 A | 3/1970 | Parker |
| 3,665,590 A | 5/1972 | Percival |
| 3,806,064 A | 4/1974 | Parilla |
| 3,860,199 A | 1/1975 | Dunne |
| 3,977,629 A | 8/1976 | Tubeuf |
| 4,009,661 A | 3/1977 | Imrie |
| 4,408,735 A | 10/1983 | Metz |
| 4,463,921 A | 8/1984 | Metz |
| 4,482,107 A | 11/1984 | Metz |
| 5,027,596 A | 7/1991 | Steenborg |
| 5,119,627 A | 6/1992 | Bradford et al. |
| 5,129,604 A * | 7/1992 | Bagley .................. F42B 10/663 239/265.15 |
| 5,275,575 A | 1/1994 | Cahaly et al. |
| 5,431,104 A | 7/1995 | Barker |
| 5,516,030 A | 5/1996 | Denton |
| 5,647,558 A | 7/1997 | Linick |
| 5,695,152 A | 12/1997 | Levy |
| 5,836,540 A | 11/1998 | Romer et al. |
| 6,009,810 A * | 1/2000 | Walsh .................. C06B 45/10 102/288 |
| 6,014,857 A | 1/2000 | Stinnesbeck |
| 6,029,883 A | 2/2000 | Bolde et al. |
| 6,138,945 A | 10/2000 | Biggers et al. |
| 6,153,505 A | 11/2000 | Bolde et al. |
| 6,178,741 B1 | 1/2001 | Nelson et al. |
| 6,272,742 B1 | 8/2001 | Armezzani et al. |
| 6,347,763 B1 | 2/2002 | Harkins et al. |
| 6,367,735 B1 | 4/2002 | Folsom et al. |
| 6,494,035 B1 * | 12/2002 | Garcia .................. F02K 9/18 102/290 |
| 6,499,287 B1 | 12/2002 | Taylor |
| 6,584,907 B2 | 7/2003 | Boucher et al. |
| 6,787,443 B1 | 9/2004 | Boggs et al. |
| 6,889,610 B2 | 5/2005 | Boucher et al. |
| 6,889,935 B2 | 5/2005 | O'Dwyer |
| 7,004,423 B2 | 2/2006 | Folsom et al. |
| 7,112,888 B2 | 9/2006 | Kuramoto et al. |
| 7,416,154 B2 | 8/2008 | Bittle et al. |
| 7,494,089 B2 | 2/2009 | Williams et al. |
| 7,540,145 B2 | 6/2009 | Rutan |
| 7,631,600 B2 | 12/2009 | O'Dwyer |
| 7,814,696 B2 | 10/2010 | Rapp et al. |
| 7,989,345 B2 | 8/2011 | Akram et al. |
| 8,084,725 B1 | 12/2011 | Dryer |
| 8,225,507 B2 | 7/2012 | Fuller |
| 8,601,790 B2 | 12/2013 | Fuller |
| 8,713,912 B2 * | 5/2014 | Dupont .................. F02K 9/32 137/68.13 |
| 8,757,065 B2 | 6/2014 | Fjerstad et al. |
| 8,950,329 B2 | 2/2015 | Villarreal et al. |
| 9,038,368 B2 | 5/2015 | Fuller |
| 9,429,104 B2 | 8/2016 | Fuller |
| 2007/0261386 A1 | 11/2007 | Benson |
| 2010/0024428 A1 * | 2/2010 | Rosenfield .................. F02K 9/34 60/770 |
| 2010/0281850 A1 | 11/2010 | Fuller |
| 2011/0009206 A1 | 1/2011 | Soracco |
| 2011/0275245 A1 | 11/2011 | Annecke |
| 2012/0060468 A1 * | 3/2012 | Dushku .................. F02K 9/08 60/255 |
| 2012/0117941 A1 * | 5/2012 | Olden .................. B64G 1/26 60/255 |
| 2012/0135620 A1 | 5/2012 | Park |
| 2014/0174313 A1 | 6/2014 | Villarreal et al. |
| 2014/0197153 A1 | 7/2014 | Aguilar et al. |
| 2016/0057882 A1 | 2/2016 | Wuerstlein et al. |
| 2016/0356245 A1 | 12/2016 | Danforth et al. |
| 2017/0234268 A1 | 8/2017 | Summers et al. |
| 2018/0129225 A1 * | 5/2018 | Schroeder .................. B63G 8/16 |

FOREIGN PATENT DOCUMENTS

| | | |
|---|---|---|
| WO | 2013/087482 A1 | 6/2013 |
| WO | 2017/176310 A1 | 10/2017 |
| WO | 2017/176311 A1 | 10/2017 |

OTHER PUBLICATIONS

International Search Report and Written Opinion for corresponding International Application No. PCT/US2017/023283 dated Dec. 20, 2017.

* cited by examiner

INTEGRATED THRUSTER

FIELD OF THE INVENTION

The invention is in the field of thrusters, such as control thrusters for flight vehicles, such as projectiles or missile.

DESCRIPTION OF THE RELATED ART

Some electrical devices, such as thrusters for divert attitude control systems, are installed with blind connections. Such devices are generally installed with the electrical connections being hand wired as part of the installation process.

In addition thrusters have generally involved a collection of components, for example with a nozzle added on to a casing. The casing may need to be robust structurally, in order to contain pressurized gases produced by propellant burning within the casing.

SUMMARY OF THE INVENTION

A thruster has a casing that includes an additively-manufactured housing.

A thruster has a casing that includes a housing that has an integrally-formed nozzle.

A thruster has a casing that includes a housing that has an integrally-formed burst disk.

A thruster is received by a receptacle that provides structural support to a housing of the thruster, to facilitate containing pressurized gases within the housing.

According to an aspect of the invention, a thruster includes: a propellant; and a casing enclosing the propellant; wherein the casing is an additively-manufactured housing; and wherein the housing defines an integral nozzle through which pressurized gases exit the casing when the propellant is burned.

According to an embodiment of any paragraph(s) of this summary, the housing also includes a burst disk in the nozzle.

According to an embodiment of any paragraph(s) of this summary, the burst disk is additively-manufactured as an integral part of the additively-manufactured housing.

According to an embodiment of any paragraph(s) of this summary, the housing includes a flat end portion and an annular portion that are additively-manufactured together as a single piece.

According to an embodiment of any paragraph(s) of this summary, the flat end portion closes off an end of the annular portion.

According to an embodiment of any paragraph(s) of this summary, the nozzle is in the flat end portion.

According to an embodiment of any paragraph(s) of this summary, the housing includes a closure that closes off an end of the annular portion that is opposite the end of the annular portion that is closed off by the flat end portion.

According to an embodiment of any paragraph(s) of this summary, the closure is welded to the annular portion.

According to an embodiment of any paragraph(s) of this summary, the housing includes a closure that forms a welded seal with the housing.

According to an embodiment of any paragraph(s) of this summary, the propellant is a solid propellant.

According to an embodiment of any paragraph(s) of this summary, the thruster includes a wave spring within the casing, holding the propellant in position within the casing.

According to an embodiment of any paragraph(s) of this summary, the thruster includes a booster within the casing, wherein the booster is operatively coupled to the propellant.

According to an embodiment of any paragraph(s) of this summary, the thruster includes an electrical igniter that is operatively coupled to the booster, to initiate a reaction in the booster.

According to an embodiment of any paragraph(s) of this summary, the electrical igniter includes a pair of electrical contacts that extend through the casing.

According to an embodiment of any paragraph(s) of this summary, the thruster is cylindrical.

According to an embodiment of any paragraph(s) of this summary, the thruster is in combination with a receptacle.

According to an embodiment of any paragraph(s) of this summary, the receptacle defines a recess that receives the thruster.

According to an embodiment of any paragraph(s) of this summary, the receptacle is electrically coupled to an igniter of the thruster.

According to an embodiment of any paragraph(s) of this summary, the recess is a cylindrical recess.

According to an embodiment of any paragraph(s) of this summary, the housing includes an annular portion.

According to an embodiment of any paragraph(s) of this summary, a gap between the annular portion and a sidewall of the receptacle is on the order of 0.00254-0.0127 mm (0.0001-0.0005 inches) radially.

According to an embodiment of any paragraph(s) of this summary, rein the receptacle provides structural support to the casing, to facilitate containing pressurized gases from burning of the propellant within the casing.

According to an embodiment of any paragraph(s) of this summary, the combination includes a cap that is mechanically connected to the thruster, filling part of the recess defined by the receptacle.

According to an embodiment of any paragraph(s) of this summary, the receptacle is additively manufactured.

According to an embodiment of any paragraph(s) of this summary, the thruster and/or combination is part of a flight vehicle.

According to an embodiment of any paragraph(s) of this summary, the thruster and/or combination is part of a projectile.

According to another aspect of the invention, a method of firing a thruster on a flight vehicle includes the steps of: initiating combustion of a propellant of the thrusters that is enclosed within a casing of the thruster; and during build-up of pressurized gases within the casing from the combustion of the propellant, supporting the casing with a receptacle of the flight vehicle into which the thruster has been inserted, to thereby prevent premature escape of the pressurized gases.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A thruster has an additively-manufactured housing that includes an integrally-formed nozzle with a burst disk in it. The housing is part of a casing that surrounds and encloses a propellant that is burned to produce pressurized gases that burst the burst disk and produce thrust. The thruster may be placed in a receptacle that defines a recess for receiving the thruster. The receptacle also may be additively manufactured. The thruster and the recess both may be cylindrical, with the housing being closely fit with the cylindrical walls of the receptacle. This may allow some of the structural loads on the housing, such as loads produced by the combustion of the propellant, to be transferred to the adjoining walls of the receptacle. This enables the housing to have less structural strength than if it were to have to contain the pressure from the propellant all on its own. There may also be advantages in terms of the thruster being limited in size and having a limited number of separate parts, thereby allowing a greater number of thrusters in a limited area on a device, such as a flight vehicle, for example a projectile.

Figure 1:
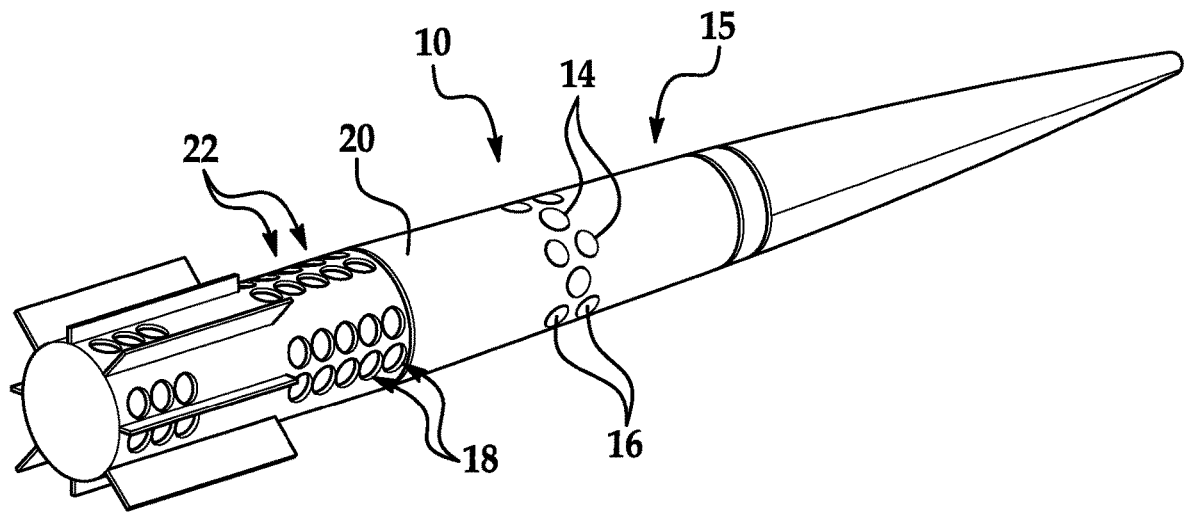
FIG. 1 is an oblique view of a flight vehicle, a projectile, in accordance with an embodiment of the invention.

FIG. 1 shows a projectile 10 that is an example of a flight vehicle that includes thrusters 14. The projectile 10 may be launched toward a target, such as by being launched from a rail gun. The projectile 10 includes a control system 15 that in turn includes of a series of the thrusters 14 in receptacles 16 that define recesses or spaces 18 at various locations along and around a fuselage 20 of the projectile 10. The thrusters 14 and the corresponding receptacles 16 constitute a series of thruster-receptacle combinations 22, thruster installations around the fuselage 20. The thrusters 14 are connected to a central controller (not shown), which is used to trigger the firing of the thrusters 14 as desired. The thrusters 14 may be fired individually or in groups, simultaneously or at different times, in order to maneuver the projectile 10 during flight. The maneuvers may involve changes in attitude or translations, or some combination of the two, in order to steer or direct the projectile on an intended course or to an intended destination.

The projectile 10 may have other components, such as fins 24 as well as other components that are not shown (such as a payload, a sensor system, a guidance system, and a communication system), that may be similar to those used in prior projectiles. Details regarding such components are not included herein.

The projectile 10 may be a projectile launched from a railgun launcher. Alternatively the projectile may be other sorts of projectiles. More broadly, such thrusters and systems may be usable in a wide variety of flight vehicles, either powered or unpowered.

The thrusters 14 may have various operating times and/or amounts of thrust. For example, some of the thrusters 14 may have a 1-2 millisecond duration.

Figure 2:
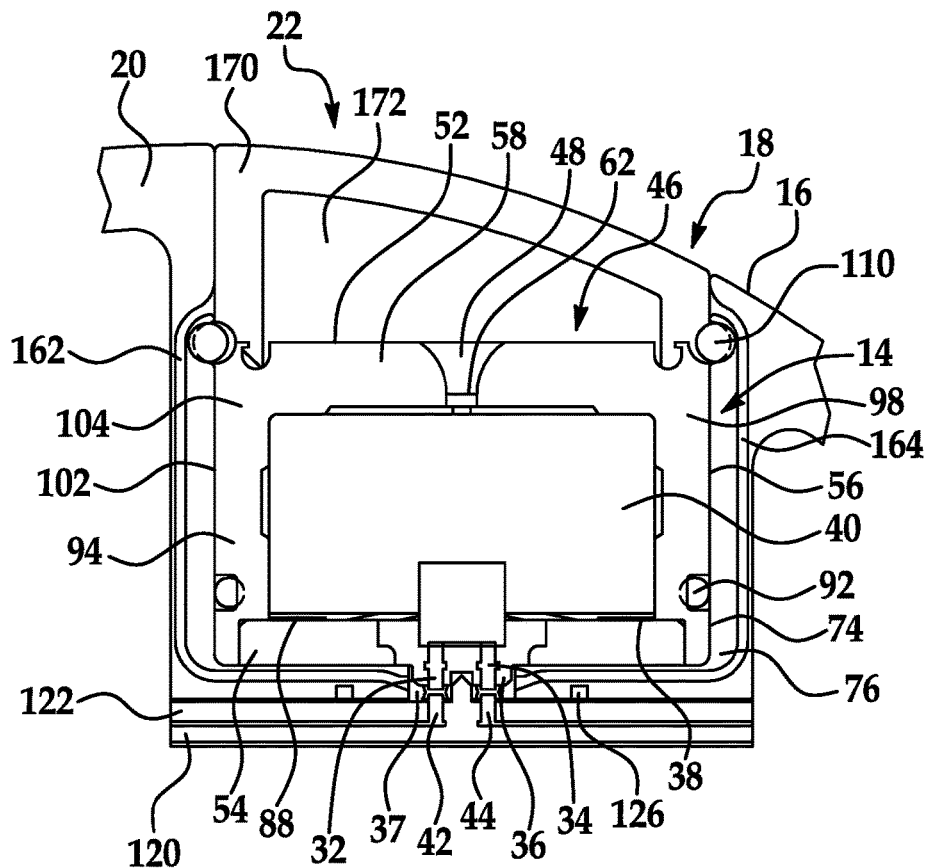
FIG. 2 is a side sectional view of a portion of the flight vehicle of FIG. 1, showing a combination of a thruster in a receptacle, according to an embodiment of the invention.
Figure 3:
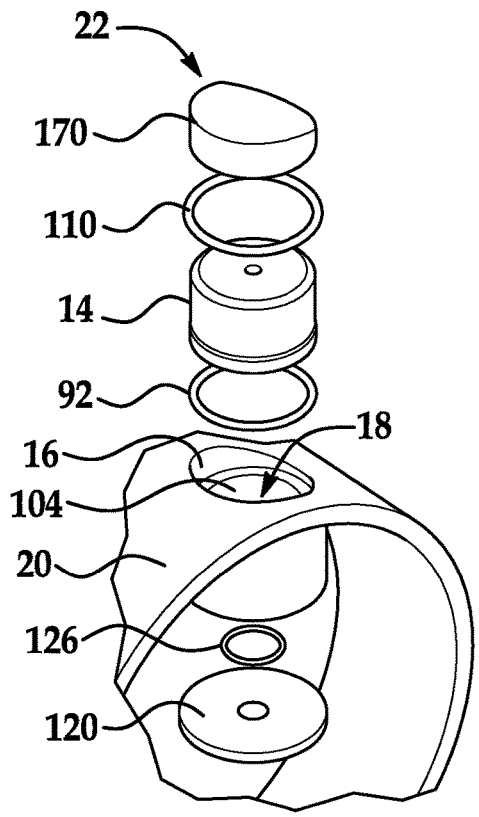
FIG. 3 is an exploded view of the combination of FIG. 2.
Figure 4:
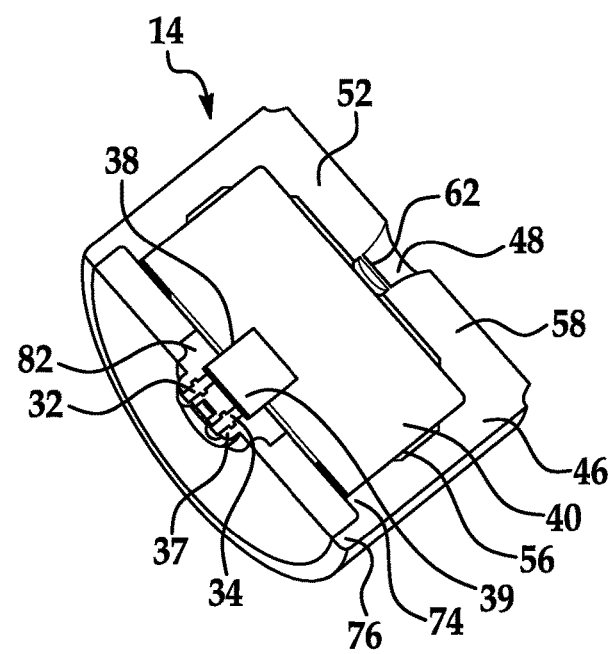
FIG. 4 is a sectional view of the thruster of the combination of FIG. 2.
Figure 5:
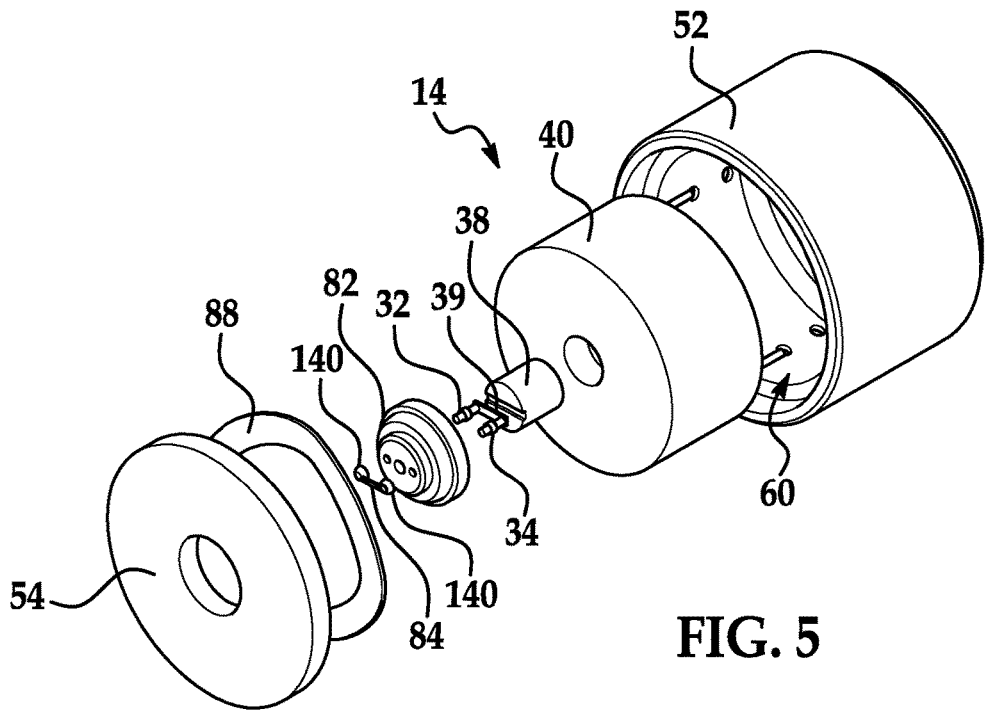
FIG. 5 is an exploded view of the thruster of FIG. 4.

FIGS. 2 and 3 show further details regarding the combination 22 of the thruster 14 and the receptacle 16. FIGS. 4 and 5 show other details of the thruster 14. The thruster 14 is produced separately as a self-contained unit, which is to be placed in one of the receptacles 16. The thruster 14 has a pair of device electrical contacts 32 and 34 that are used for making electrical connection with receptacle electrical contacts 42 and 44 of the receptacle 16. The device electrical contacts 32 and 34 may be on a protrusion 36 of the thruster 14, which may engage a recess 37 of the receptacle 16 wherein the receptacle electrical contacts 42 and 44 are located. The electrical connection is a blind connection, in that the connection is made in a location within the receptacle 16, externally inaccessible to the installer. In the illustrated embodiment the connection is made at the bottom end of the thruster 14, where the thruster 14 engages the bottom of the receptacle 16.

The thruster 14 includes a booster 38 that is operatively coupled to a bridge wire 39 that is connected to the device electrical contacts 32 and 34. The booster 38 is also operatively coupled to a propellant 40. Power is applied to the device contacts 32 and 34 to allow the bridge wire 39 to initiate combustion (or detonation) in the booster 38, which in turn initiates combustion in the propellant 40. A casing 46 of the thruster 14 encloses and protects the internal components, the booster 38, the bridge wire 39, and the propellant 40. The casing 46 may have a built-in nozzle 48 through which pass the products from combustion of the propellant 40.

The casing 46 is made of two parts, a housing 52 and a closure 54. The housing 52 has a cylindrical shape, with an annular portion 56 and a flat end portion 58. The end portion 58 closes off one side (end) of the annular portion 56, with the portions 56 and 58 together defining a recess or propellant chamber 60 in which the propellant 40 is located. The nozzle 48 is part of the flat end portion 58, and may be centrally located on the end portion 58 along a central longitudinal axis of the housing 52. The nozzle 48 may have a shape that chokes the flow of pressurized gases produced by the combustion of the propellant 40, and produces good thruster characteristics.

The end portion 58 has a burst disk 62 that is located in the nozzle 48. The burst disk 62 is configured to initially confine the pressurized gases produced by combustion of the propellant 40. The pressure builds up within the propellant chamber 60 while the burst disk 62 is intact. Eventually the pressure gets high enough to rupture the burst disk 62, which allows the pressurized gases to escape the propellant chamber 60, producing the thrust that produces a force on the projectile 10 (FIG. 1). The use of the burst disk 62 allows the thrust to be produced in a short-duration burst. The burst disk 62 is designed to have a thickness such that it remains intact up to the point at which the chamber achieved 80% of the desired operating pressure. Upon achieving a pressure higher than that of 80% of the desired operating pressure, the burst disk 62 will break or rupture, according to one embodiment.

The housing 52 may be additively manufacturing as a single part, with the portions 56 and 58, the nozzle 48, and the burst disk 62 all being features that are formed in additive manufacturing processes. The housing 52 may be made out of any of a variety of suitable metals or alloys (or mixtures), with examples being a nickel-chromium-based alloy (such as sold under the trade name INCONEL), titanium, any of a variety of steel alloys, or aluminum with a suitable additive (such as silicon) in order to prevent combustion. The housing 52 may also be made out of a variety of suitable high-strength materials such as high-strength plastics or composite materials such as fiberglass or carbon fiber composites. The additive manufacturing processes may be any of a variety of suitable processes, including three-dimensional printing or extrusion, to give two examples. When these three-dimensional printing or extrusion processes consist of metals or alloys as the material being deposited to manufacture the part, the specific process may include, but is not limited to direct-metal laser melting (DMLM). When these three-dimensional printing or extrusion processes consist of high-strength materials such as high-strength plastics as the material being deposited to manufacture the part, the specific process may include, but is not limited to selective-laser sintering (SLA). When these three-dimensional printing or extrusion processes consist of high-strength composite materials that contain glass or carbon fibers as the material being deposited to manufacture the part, the specific process may include, but is not limited to, fused deposition modeling (FDM).

The open end of the annular housing portion 58 is blocked by a closure 54. The closure 54 may be a disk-shaped metal piece that is attached to the annular housing portion 58. The closure 54 may be made of a metal or alloy, such as of the same material as that of the housing 52. The closure 54 may be attached to the housing 52 by welding, such as by friction welding or laser welding. The annular housing portion 58 may have a ledge 74, surrounded by a lip 76, for receiving the closure 54.

An insulator piece 82 may be located in a central hole in the closure 54, along a longitudinal axis of the thruster 14. The insulator 82 interfaces with the device electrical contacts 32 and 34, allowing the device electrical contacts to pass through the insulator 82. Outside the thruster 14 the device electrical contacts 32 and 34 are electrically connected with the receptacle electrical contacts 42 and 44, as described above. A shunt 84 between the device electrical contacts 32 and 34 is also outside of the insulator 82. The shunt 84 is a safety feature that prevents premature detonation of the thruster 14, such as during shipment and handling, and is removed prior to or as a part of the installation of the thruster 14 in the receptacle 16. Internally within the thruster 84, in the recess 60 enclosed by the housing 52, the device electrical contacts 32 and 34 are electrically connected to the bridge wire 39, to allow activation of the booster 38. The insulator 82 may be made of a suitable electrical insulator, such as a non-conductive rubber, plastic, glass, or ceramic.

The propellant 40 may be any of a variety of suitable solid propellants. A spring, such as a wave spring 88, may be located in the recess 60, between the closure 54 and the propellant 40, to hold the propellant 40 in place, and to keep the propellant 40 from sliding within the recess 60.

A thruster electro-magnetic interference (EMI) seal 92 is located in a groove 94 around the circumference of the annular housing portion 58. The thruster EMI seal 92 provides EMI sealing in a gap 98 between the housing 52 and the receptacle 16. Typical EMI seals may be made of electrically conductive or dissipative rubber.

The gap 98 may be small, providing a tight fit between the outer wall 102 of the housing 52, and the inner wall 104 if the receptacle 16. The gap 98 may be narrow enough such that the receptacle 16 provides structural support to the casing 46, to aid in containing the pressurized gases in the casing 46 prior to the rupture of the burst disk 62. The typical slip-fit gap for assemblies of about 2.54 cm (1 inch) diameter is 0.00254-0.0127 mm (0.0001-0.0005 inches) radially. The housing 52 may be in contact with the receptacle inner wall 104 even prior to the initiation of the combustion in the propellant. If this occurs, it is likely due to the small gap size is that is preferentially present to maintain a tight fit between the two components and their respective surfaces. However it is not a requirement nor expected that all or a majority of the housing 52 be in contact with the receptacle inner wall 104 prior to the initiation of combustion since the housing 52 will often expand or yield slightly to force mechanical contact upon pressurization of the internal volume. The combustion of the propellant 40 within the recess causes the housing 52 to expand to press against the inner wall 104. This diverts some of the structural load from the casing 46 to the receptacle 16. This load transfer allows the housing 52 to be less structurally robust, for example by allowing the housing 52, and in particular the annular portion 56, to be thinner and lighter, taking up less volume. This allows the thruster 14 to be smaller overall, which can allow for an increased density of the thrusters 14 on the projectile 10 (FIG. 1), with closer spacing between adjacent of the thrusters 14. This also allows for an increase in propellant loading volume in the case where the outer wall dimension is maintained, while the wall thickness is decreased to the smallest thickness allowable given the design constraints, thus increasing the internal chamber dimensions.

A retaining ring 110 may be used to hold the thruster 14 in place after the thruster 14 has been inserted into the receptacle 16. The retaining ring 110 may be made of metal, plastic, or another suitable material.

In the illustrated embodiment the receptacle electrical contacts 42 and 44 may be parts of a circuit card assembly (CCA) 120. Traces 122 on the CCA 120 may be hooked up to a controller that sends signals controlling the firing of the thruster 14.

A card EMI seal 126 may surround the region where the device electrical contacts 32 and 34 make electrical connection with the receptacle electrical contacts 42 and 44. The card EMI seal 126 may protect the electrical connections from electro-magnetic interference. The card EMI seal 126 may be pressed between the CCA 120 and a bottom structure of the receptacle 16.

The device electrical contacts 32 and 34 and/or the receptacle electrical contacts 42 and 44 may have solder balls on their ends, such as the solder balls 140, to aid in making the electrical connection between the two pairs of electrical contacts. The traditional solder balls are manufactured with tin-based alloys. The receptacle 16 may have channels 162 and 164 that are used to direct hot air (or other hot gas) the vicinity of the solder balls 140 after insertion of the device 14 into the receptacle 16, in order to melt the solder of the solder balls 140, which then re-solidifies to make solid electrical connections between the contacts 32 and 42, and the contacts 34 and 44.

The channels 162 and 164 may be formed in additive manufacturing process for making the receptacle 16, either separately from or as part of a process for making a larger part, such as a fuselage of the projectile 10 (FIG. 1). The most favorable channel dimensions may be approximately 0.762 mm (0.030 inches) in diameter and under 2.54 cm (1 inch) long, to minimize heat and flow losses. These values are merely non-limiting examples.

Additive manufacturing or three-dimensional printing methods that may be used for producing the receptacle 16 (including the channels 162 and 164 include processes, other layerwise deposition processes, and methods, such as, but not limited to: Direct Metal Laser Melting (DMLM), Selective Laser Sintering (SLS), Stereolithography (SLA), micro-stereolithography, Laminated Object Manufacturing (LOM), Fused Deposition Modeling (FDM), MultiJet Modeling (MJM), aerosol jet, direct-write, inkjet fabrication, and micro-dispense. Areas of overlap can exist between many of these methods, which can be chosen as needed based on the materials, tolerances, size, quantity, accuracy, cost structure, critical dimensions, and other parameters defined by the requirements of the object or objects to be made.

The channels or passages 162 and 164 may be used to transport hot gas, such as hot air, in order to heat the solder of the solder balls 140 to make the electrical connection 10. The hot air may be provided a hot air gun or other suitable hot air source. The hot air may be of suitable temperature and directed through the channels 162 and 164 for a suitable time, in order to melt the solder balls 140 as necessary in order to make the electrical connection. It will be appreciated that the air (or other gas) temperature, flow rate, and flow timing may be controlled to prevent overheating of the solder and/or other components, for example to prevent flow of the solder away from where the electrical connection is made, and/or to prevent damage to other components, such as parts of the thruster 14 and/or the receptacle 16.

Many variations are possible, including sending the heated gas through the channels 162 and 164 one at a time. Also, the channels 162 and 164 may be used such that one channel at a time is used for flow of heated air to the soldering location, with the other channel used for the flow of return air.

A cap or plug 170 may be placed in the receptacle 16, engaging the housing end portion 58. The cap 170 may have hooks that engage corresponding hooks on the housing end portion 58, to maintain the cap 170 secured to the housing 52. The cap 170 may be used to maintain an aerodynamic shape for the projectile 10 (FIG. 1), providing a flush surface with the adjoin areas of the fuselage 20 (FIG. 1). The cap 170 also may be used to block the openings to the external environment at the ends of the channels 162 and 164. The cap 170 may be made of plastic or another suitable material, and may be hollow, enclosing a recess or space 172 between the cap 170 and the housing 52. The cap 170 may be one of a series of caps with different configurations, in order to engage the thruster 14 to allow a smooth (aerodynamic) outer surface for the projectile 10. This may enable use of a single thruster configuration for a variety of different locations along the projectile 10.

In a specific embodiment the thruster 14 may have a diameter of 1.88 cm (0.74 inches) and a length (height) of 1.27 cm (0.5 inches). It will be appreciated that the thruster 14 may have a wide variety of other sizes and/or configurations, for engaging suitably sized receptacles.

In use an electrical signal is passed from the receptacle electrical contacts 42 and 44 to the device electrical contacts 32 and 34. This causes a signal to pass into the bridge wire 39 which initiates combustion in the booster, which in turn initiate combustion in the propellant 40. Combustion of the propellant 40 builds up pressure in the recess 60. This pressure is initially contained by within the casing 46, with the walls of the receptacle 16 providing some structural support to maintain the integrity of the casing 46. Eventually the burst disk 62 ruptures. The pressurized gases then escape the casing 46 through the nozzle 48. The cap 170 is blown free of the projectile 10, and the pressurized gases provide thrust as they are ejected into the atmosphere (or space) around the projectile 10.

In an alternative use the cap 170 may be made of a heavier material, such as a suitable metal or alloy. The pressurized gases that escape the casing 46 through the nozzle 48 then build up pressure in the recess 172 underneath the cap 170. At a certain point, this pressure becomes sufficiently high to expel the cap 170 from the receptacle 16 at high velocity, with thrust provided as a reaction to the momentum carried away by the cap 170. In this case the nozzle 48 may be allowed to erode to some extent without impacting thrust from expulsion of the cap 170. This would further allow the possible use of plastics instead of metals.

The thruster 14 may fit in a compact package, due to the various advantages described above. The thruster 14 as described above may allow for mass production of similar thrusters for use in closely packed different receptacles around a flight vehicle such as a projectile. Thrusters such as the thruster 14 may be easily installed to produce a reliable control system.

Integrating the nozzle 48 into the casing 46 may allow the thruster 14 to be shorter (have a smaller length), relative to thrusters that have a separate nozzle external to the casing. In addition, avoiding a separate nozzle piece may facilitate easier manufacture and/or installation.

Many variations are possible changing certain aspects of the illustrated embodiment of the thruster 14. The thruster 14 may have different dimensions, and/or a different shape. The thruster 14 and/or the receptacle 16 may have different features, certain features omitted, and/or different configurations of the various features described above.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A thruster comprising:
   a propellant; and
   a casing enclosing the propellant;
   wherein the casing includes an additively-manufactured housing that includes an end portion and an annular portion that are additively manufactured together as a single piece;
   wherein the housing defines an integral nozzle through which pressurized gases exit the casing when the propellant is burned;
   wherein the housing also includes a burst disk in the nozzle;
   wherein the burst disk is additively-manufactured as an integral part of the additively-manufactured housing, the burst disk being part of the single piece; and
   further comprising a cap that is mechanically connected to the housing, with the cap configured to be separated from the housing through the action of pressurized gasses that escape the casing through the nozzle into a recess between the cap and the housing.

2. The thruster of claim 1,
   wherein the end portion is a flat end portion;

wherein the flat end portion closes off an end of the annular portion; and wherein the nozzle is in the flat end portion.

3. The thruster of claim 2, wherein the casing includes a closure that closes off an end of the annular portion that is opposite the end of the annular portion that is closed off by the flat end portion.

4. The thruster of claim 3, wherein the closure is welded to the annular portion.

5. The thruster of claim 1, wherein the casing includes a closure that forms a welded seal with the housing.

6. The thruster of claim 1, wherein the propellant is a solid propellant.

7. The thruster of claim 6, further comprising a wave spring within the casing, holding the propellant in position within the casing, with the wave spring pressing against the propellant and the closure.

8. The thruster of claim 1, further comprising a booster within the casing, wherein the booster is operatively coupled to the propellant.

9. The thruster of claim 8, further comprising an electrical igniter that is operatively coupled to the booster, to initiate a reaction in the booster.

10. The thruster of claim 9, wherein the electrical igniter includes a pair of electrical contacts that extend through the casing.

11. The thruster of claim 1, wherein the thruster is cylindrical.

12. The thruster of claim 1, wherein the burst disk and the rest of the housing are a single piece of material.

13. The thruster of claim 1, in combination with a receptacle, wherein the receptacle defines a recess that receives the thruster; and wherein the receptacle is electrically coupled to an igniter of the thruster; and wherein the cap is located in the recess defined by the receptacle and blocks an external opening of the recess defined by the receptacle.

14. The combination of claim 13, wherein the receptacle provides structural support to the casing, to facilitate containing pressurized gases from burning of the propellant within the casing.

15. The combination of claim 13, wherein the receptacle is additively manufactured.

16. The combination of claim 13, as part of a flight vehicle.

17. The combination of claim 13, as part of a projectile.

18. The combination of claim 13, wherein the cap has a shape that provides flush surface with portions of the receptacle adjoining the recess defined by the receptacle.

19. The combination of claim 13, wherein the cap has hooks that engage corresponding hooks on the housing.

* * * * *